May 6, 1924.
F. W. WOOD
ELECTRICAL INDICATOR MOTOR
Filed May 6, 1921
1,492,913
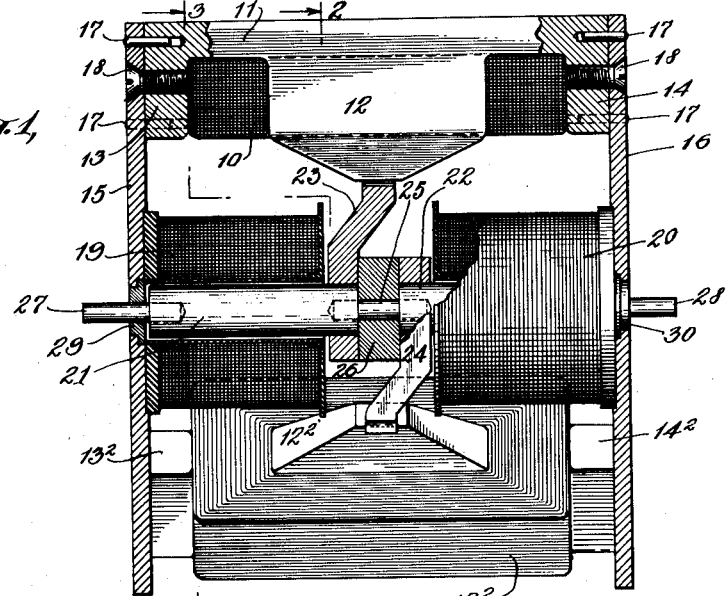
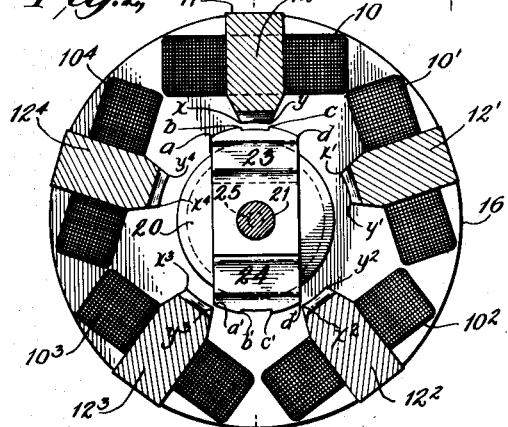
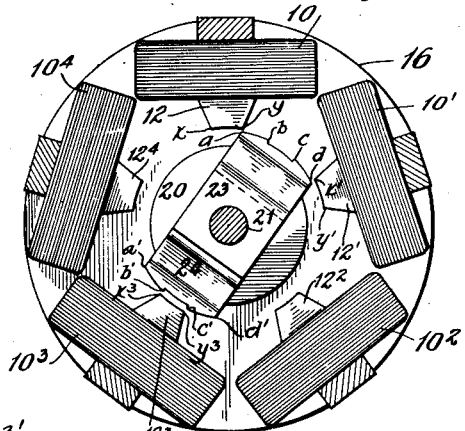
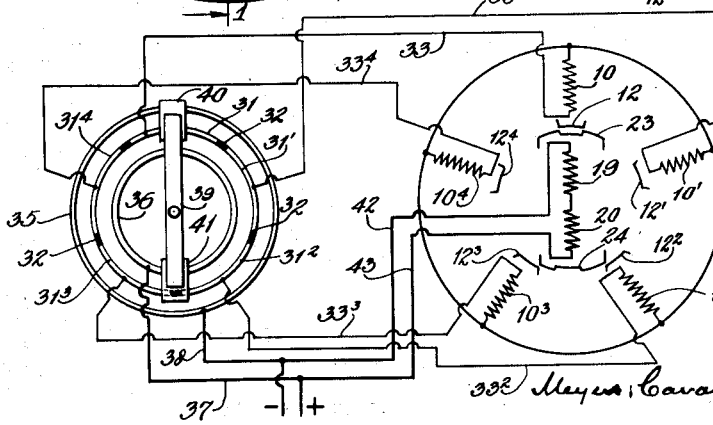
INVENTOR
FRANK W. WOOD
BY
Meyers, Cavanagh, Whitehead & Hyde
ATTORNEYS Patented May 6, 1924.

1,492,913

UNITED STATES PATENT OFFICE.

FRANK W. WOOD, OF MONTCLAIR, NEW JERSEY, ASSIGNOR TO CHAS. CORY & SON, INCORPORATED, OF NEW YORK, N. Y., A CORPORATION OF NEW YORK.

ELECTRICAL INDICATOR MOTOR.

Application filed May 6, 1921. Serial No. 467,409.

*To all whom it may concern:*

Be it known that I, FRANK W. WOOD, a citizen of the United States, and resident of Montclair, in the county of Essex and State of New Jersey, have invented certain new and useful Improvements in Electrical Indicator Motors, of which the following is a specification.

This invention relates to an electrical indicator motor and more particularly to a motor the rotor of which is connected to an indicating element and is adapted to be moved step by step to assume successive positions by the selective energization of magnetic circuits and has special reference to the provision of a motor of this type in which the rotor is capable of taking its steps with facility when successive selective circuits are energized and is capable of taking such steps without drag or lag in the rotor, and in which the said rotor after taking a step or steps will quickly assume a balanced position in the magnetic field with the oscillations of the rotor and the indicating element effectively damped.

In a motor of the step-by-step type referred to, a series of electromagnets constituting the stator are symmetrically arranged in spaced relation about a central axis, the rotor movable about such axis being provided for cooperation with the stator, the rotor being movable in its rotation about the said axis into a series of successive positions by the selective energization of magnetic circuits. One of the desiderata in a successful motor of this nature comprehends the provision of a construction in which the magnetic forces operative on the rotor in each of its positionings will not only effectively hold and magnetically lock the rotor in each of such positions, but in which the rotor is ready to take a step into a successive position when successive magnetic circuits are energized. A further desideratum comprehends a construction in which the rotor, when successive magnetic circuits are selectively energized, will take its step without any drag with respect to the transmitting circuits effecting the energization. A still further important consideration involves the ability to bring the rotor to a quick halt in a balanced magnetic field in order to eliminate any tendency towards indecision in the indicator connected to the rotor in assuming a definite position with respect to its dial, such indecision resulting from the oscillations of the rotor incident to its assuming a new position in a newly created magnetic field. My invention contemplates a motor construction in which these desired ends are effectively attained by simple elements arranged in a simple manner.

I have found that the rotor of a step-by-step motor may be very effectively balanced by means of magnetic concentration on points between the rotor and stator pole pieces. I have found that a construction in which each rotor pole piece in each of its step-by-step positions cooperates with the stator pole pieces by having the points or edges of one adjacent the points or edges of the other, so that magnetic cooperation is effected between points in lieu of between pole faces, that the rotor can be magnetically locked in each of its positions by the magnetic flux concentration at such points. This result of magnetic point concentration is broadly secured by the arrangement and spacing of the pole pieces of the stator, the pole piece faces of the stator and rotor being made of a predetermined length, some of the pole pieces being notched in a predetermined manner. With such a construction not only is the rotor retained in balanced condition in any of its assumed positions, but the concentrated magnetic lines of force flowing from pole to pole at spaced points is operative to cause the rotor to assume or take its position in a magnetic field without disturbing oscillations, the oscillations of the rotor being virtually damped by the forces exerted in the regions at the pole points. My invention looked at from one aspect may therefore be said to comprehend a motor in which the stator pole pieces cooperate with the rotor pole pieces in each of the step-by-step positions of the latter by a balancing on points or a magnetic concentration on points between the said stator and rotor pole pieces respectively.

In prior designs of step-by-step motors, when successive transmitting circuits are closed, the rotor of the motor shows a pronounced tendency of lag or drag behind the operation or the actuation of the said transmitting circuits. This results from a number of causes, the most dominant of which is probably the effect of the polarity induced in adjacent stator poles by the energized rotor and stator pole pieces. My present invention further contemplates an arrangement and spacing of the stator magnetic pole pieces and a cooperation of such pole pieces with the rotor poles to minimize induced polarity and to otherwise reduce rotor drag by minimizing the effect of residual magnetism in the stator pole pieces. The reducing of rotor lag also yields a construction in which the rotor will initiate the stepping activity with facility, the notching of the pole pieces above referred to being predetermined to permit such facility of the rotor in taking its step.

The principal objects of my invention therefore include, in addition to the provision of a step-by-step motor the rotor of which is adapted to position an indicator in one or more of a series of selected positions, the provision of such a motor in which the rotor will be capable of efficient operation to take any successive step with ease and without drag and to assume such step without rotor oscillations and to keep such step in a balanced magnetic field against displacement incident to vibration or shock; and the further provision of a step-by-step motor of this type in which the parts are mechanically balanced as well as electrically and magnetically balanced, and in which such parts are few and simple, subject to low cost manufacturing operations.

To the accomplishment of the foregoing and such other objects as may hereinafter appear, my invention consists in the elements and their relation one to the other, as hereinafter particularly described and sought to be defined in the claims, reference being had to the accompanying drawings which show a preferred embodiment of my invention and in which:

Figure 1 is a view of my motor with parts shown in cross section on the line 1—1, Figure 2, Figure 2 is a cross sectional view on a reduced scale on the line 2—2, Figure 1, showing the rotor in one of its positions, Figure 3 is a cross sectional view on a reduced scale taken on the broken line 3—3, Figure 1, showing the rotor in a next adjacent successive position, and Figure 4 is a diagrammatic view showing the wiring of the motor and its electrical connection to a transmitting system.

The stator of the motor comprises a series of spaced electromagnets 10, 10', 10², 10³ and 10⁴ arranged circumferentially about a central axis. Each electromagnet comprises preferably a single winding having the axis thereof arranged centrally of the motor, as clearly shown in the drawings, the axes of the circumferentially spaced magnets lying in a medial plane of the motor. Each winding such as 10, for example, is supported by a member 11 of magnetic material, the said member being E-shaped in longitudinal cross section, as shown particularly in Figure 1 of the drawings, the central branch arm 12 of the E forming the magnet core and pole piece, the end branch arms 13 and 14 forming flanges adapted to be fixedly connected on the opposed preferably circular end supporting plates 15 and 16, these plates being also made of magnetic material, the spaces between the branch arms of the E member forming a socket for supportingly receiving the magnet winding 10. For the purpose of properly positioning each E-shaped member in its circumferential position about the central axis, I preferably provide alined bores in the plates 15 and 16 and the end branch arms of the E member, the said alined bores receiving positioning dowel pins such as 17, the E members being preferably further secured in position by means of bolt securing means 18.

The rotor of the motor includes axially alined windings 19 and 20, these windings being preferably fixedly mounted on the supporting plates 15 and 16 respectively. The rotor proper comprises the axially arranged core members 21 and 22, the cores 21 and 22 carrying the pole pieces 23 and 24 respectively, the cores and pole pieces being made of a suitable magnetic material. The alined cores are connected together by means of a rod 25 made of non-magnetic material, a spacing member 26 also of non-magnetic material being interposed between the pole pieces 23 and 24 to break any magnetic connection therebetween. Fitted to opposite ends of the rotor cores 21 and 22 are the spindles 27 and 28 made of non-magnetic material, the said spindles being journalled in bushings 29 and 30 fitted centrally of the opposed supporting plates 15 and 16, the provision of the spindles and bushings made of non-magnetic material effecting and permitting movement of the rotor in the magnetic field without "sticking" of the rotor journals in the rotor bearings cooperating therewith. The rotor pole pieces 23 and 24 are arranged in opposed relation and intermediate the solenoids 19 and 20, as clearly shown in Figure 1 of the drawings, the operative rotor poles being arranged to lie in a plane coincident with the medial plane of the stator pole pieces. The arrangement of the stator and rotor windings with the stator and rotor pole pieces having the centers of the pole faces in a single medial plane of the motor provides a construction in which the parts are effectively mechanically balanced, the provision of a single series of stator windings further presenting a simplicity of construction and at the same time yielding a motor in which the magnetic paths through the rotor and stator elements are simplified. Thus, referring to Figure 1 of the drawings, a magnetic circuit may be traced from the stator pole piece 12 through the rotor pole piece 23 through the core 21, the lines of force then radiating into the plate 15 and flowing through the arm 13 of the E member, through the leg of the E and back to the core member 12. With this construction it will be seen that each core member presents or provides a partial magnetic circuit which is individual to the winding or coil thereon, the magnetic paths for all the stator windings being thus separated with the result that the magnetic circuits are localized to produce an efficient stabilizing operation of the motor.

The motor exemplified in my present disclosure is of the type in which the rotor is adapted to take a number of steps equal to a multiple of the number of stator electromagnets used. In the present form of my invention a rotor pole piece is adapted to take a position adjacent a stator pole piece and also a subsequent position between two stator pole pieces. I accordingly provide a transmitter and electrical connections between the transmitter and the motor to accomplish the desired stepping of the rotor. Such a transmitter may take the form shown in Figure 4 of the drawings, although it will be apparent to those skilled in the art that other transmitters may be used to accomplish the same end, it being further understood that the motor may be constructed to take other steps besides those herein disclosed; the present exemplification being by way of disclosing the preferred construction. The transmitter shown in Figure 4 may comprise a series of segments 31, 31', 31$^2$, 31$^3$ and 31$^4$, the segments being insulated from each other by means of the insulating pieces 32, each of the segments being electrically connected to one terminal of a stator electromagnet of the rotor, the other terminals of the stator windings being connected together by a common lead or ring. To this end the segment 31 is connected by means of a lead 33 to one end of the stator winding 10, the segments 31' to 31$^4$ being, in turn, connected by means of the leads 33' to 33$^4$ to the stator electromagnets 10' to 10$^4$, the leads being connected each to one terminal of the stator windings, the other terminal of the stator windings being connected to a common lead or ring 34, as particularly shown in Figure 4 of the drawings. The transmitting system further comprises two concentric rings, an outer ring 35 and an inner ring 36, the said inner ring 36 being electrically connected as by lead 37 to one terminal of a source of power, the outer ring 35 being connected, in turn, as by lead 38 to the opposite terminal of a source of power. The rotatable arm 39 of the transmitting member is provided at its opposite ends with contact elements 40 and 41, the contact element 40 bridging the segments 31 with the outer ring 35, the contact element 41 bridging the segments 31 with the inner ring 36. The rotor windings 19 and 20 are connected directly to the opposite terminals of the source of power by means of the connections 42 and 43.

By means of the wiring diagrams shown, it will be apparent that to effect the positioning the rotor as shown in Figure 2 of the drawings, the rotatable transmitter arm 39 should be rotated to assume the position shown in Figure 4 of the drawings. Tracing the circuit in this position it will be seen that the current from the source of power flows through the lead 37, ring 36, contact element or brush 41, into the segments 31$^2$ and 31$^3$, the current dividing and flowing through the leads 33$^2$ and 33$^3$ energizing the electromagnet windings 10$^2$ and 10$^3$, the current joining in the ring 34 and flowing through the electromagnet winding 10, lead 33, segment 31, through brush element 40 to ring 35 and back to the opposite terminal of the source of power through connection 38. When in this position electromagnets 10, 10$^2$ and 10$^3$ are energized, the pole pieces 12, 12$^2$ and 12$^3$ cooperating with the rotor pole pieces 23 and 24 to cause the rotor to assume a balanced position in the magnetic field, as shown in Figures 2 and 4 of the drawings. It will be apparent, furthermore, from the wiring diagram in Figure 4 of the drawings, that when the transmitter arm 39 is rotated clockwise to a position where brush element 40 assumes a position bridging segments 31 and 31', with the brush element 41 assuming a position solely in contact with segment 31$^3$, that the electromagnet windings 10, 10' and 10$^3$ will be energized to rotate the rotor to a position shown in Figure 3 of the drawings.

As heretofore mentioned, I have found that the rotor and stator pole pieces may be so constructed and arranged as to yield a motor in which the rotor will assume a step with its oscillations effectively damped and will retain such step in substantially locked position in the magnetic field. To this end the rotor and stator pole pieces are constructed so that during each positioning of the rotor the magnetic cooperation between stator and rotor pole pieces will take place between points or edges in lieu of between faces, the lines of flux in the magnetic circuit concentrating on the points and yielding concentrated forces at such points to effect a rapid orientation of the rotor in any desired position and to hold such rotor in its assumed position. In the present form of my invention I accomplish this relation and these results by first predetermining the length of a rotor pole face such that its length measured on a circumference is substantially equal to the distance between adjacent stator pole pieces, and second by notching the pole pieces, preferably the rotor pole pieces, so that the length of each notch is predetermined and made equal to the length of a stator pole face. This is clearly shown in Figures 2 to 4 of the drawings and such a construction accomplishes the desired end for all rotor positionings, the two positions illustrated in Figures 2 and 3 of the drawings exemplifying the functions accomplished in all the rotor positions. Referring to Figure 2 of the drawings, it will be noted that the pole piece 12 has a predetermined length of face $xy$ and that the rotor 23 has a predetermined notch between the points $bc$, the circumferential length of such notch being substantially equal to the predetermined length $xy$. With this construction the magnetic cooperation between the pole piece 12 and pole piece 23, in the main, takes place between points or edges $x$ and $b$ and points or edges $y$ and $c$ respectively. It will be further noted that the rotor pole piece 24 positioned between the stator pole pieces $12^2$ and $12^3$ has the edges or points $a'$ and $d'$ cooperate with the points or edges $y^3$ and $x^2$ of the pole pieces $12^3$ and $12^2$ respectively, the cooperation between the pole piece 24 and pole pieces $12^3$ and $12^2$ being also, therefore, on concentrated points or edges. When the rotor assumes the position as shown in Figure 3 of the drawings, the conditions will be reversed but to the same effect. The rotor pole piece 23 will then have its points or edges $a$ and $d$ cooperate with the points or edges $y$ and $x'$ of the stator pole pieces 12 and 12' respectively, the rotor pole piece 24 then having its points $b'$ and $c'$ cooperate with the points $x^3$ and $y^3$ of the stator pole piece $12^3$. It will be therefore apparent that in each of the positionings of the rotor throughout its series of positions in its rotation the cooperation between the rotor and stator will be substantially on points or edges in all the cooperating regions therebetween. By this construction the rotor will assume a definite position in the magnetic field, the rotor assuming such position with its oscillations effectively damped, the concentrated magnetic forces holding the rotor magnetically locked in its assumed position.

In order to eliminate the effects of residual magnetism in the deenergized magnets and the effect of a polarity induced in such magnets by the adjacent energized stator and rotor poles for the purpose of preventing or eliminating drag or lag in the rotor when magnetic circuits are selectively energized, I space the stator pole pieces substantially far apart with the rotor pole pieces cooperating with the spaced apart stator pole pieces in such manner as to minimize induced poles and minimize the effect of residual magnetism. In my present exemplification I space the stator poles with an air gap therebetween equal to three times the predetermined length of a stator pole piece face, such length of face embracing an arc by 18°. The rotor face is accordingly made equal to the air space and therefore to 54°, each rotor being provided with a central notch of 18°. Other arrangements may be obviously provided to accomplish the same results and it will be understood that I do not intend to limit the invention to the arrangement herein described, although such arrangement is the preferred form and has been found to yield the desired results of eliminating drag or lag in the rotor.

The use and operation of my improved step-by-step motor will, in the main, be apparent from the above detailed description thereof. It will be apparent, furthermore, that I have provided a construction embracing few parts and subject to simple manufacturing operations, the parts being relatively arranged to secure an effective mechanical, electrical and magnetic balancing of the correlated parts. The mechanical construction is such that the rotor will move in the magnetic fields mechanically well balanced and without "sticking." The electrical and magnetic arrangement is such that the rotor will initiate its stepping activity with facility, will take its step without lag behind the transmitting circuits, will assume a new step without disturbing oscillations of the rotor and the indicating needle attached thereto and will be firmly held in its assumed step by the concentrated spaced magnetic fields.

While I have shown my device in the preferred form, it will be obvious that many changes and modifications may be made in the structure disclosed without departing from the spirit of the invention, defined in the following claims.

I claim:

1. In an electrical indicator motor in which a rotor pole piece cooperates with adjacent stator pole pieces in the successive positionings of the rotor, a stator comprising a plurality of electromagnets symmetrically spaced about a central axis, each magnet being provided with a pole piece having a predetermined length of pole face, a rotor cooperating with said stator, the rotor having its axis coincident with the said central axis, the rotor comprising a plurality of pole pieces, each rotor pole piece also having a predetermined length of pole face, the length of a rotor pole piece face being unequal to the length of a stator pole face and equal to the distance between the stator pole pieces, the unequal pole faces of stator and rotor pole pieces being contoured to provide for proximating positioning of spaced edges or corners of a rotor pole piece with spaced edges or corners of a stator pole piece whereby magnetic point concentration between rotor and stator is provided in the successive positionings of the rotor.

2. An electrical indicator motor including a stator comprising a plurality of electromagnets symmetrically spaced about a central axis, each magnet being provided with a pole piece having a predetermined length of pole face, the distance between the pole pieces being greater than the said predetermined length of a pole piece face, a rotor cooperating with said stator, the rotor having its axis coincident with the said central axis, the rotor comprising a plurality of pole pieces, each rotor pole piece also having a predetermined length of pole face, the length of a rotor pole piece face being equal to the distance between the stator pole pieces and the said rotor pole face being contoured to provide spaced edges or corners therein the distance between which is equal to the length of a stator pole face.

3. An electrical indicator motor including a stator comprising a plurality of electromagnets symmetrically spaced about a central axis, each magnet being provided with a pole piece having a predetermined length of pole face, a rotor cooperating with said stator, the rotor having its axis coincident with the said central axis, the rotor comprising a plurality of pole pieces, each rotor pole piece also having a predetermined length of pole face, the length of a rotor pole piece face being greater than the length of a stator pole piece face with the length of a rotor pole piece face equal to the distance between the stator pole pieces and the said rotor pole face being contoured to provide spaced edges or corners therein the distance between which is equal to the length of a stator pole face.

4. An electrical indicator motor including a stator comprising a plurality of electromagnets symmetrically spaced about a central axis, each magnet being provided with a pole piece having a predetermined length of pole face, a rotor cooperating with said stator, the rotor having its axis coincident with the said central axis, the rotor comprising a plurality of pole pieces, each rotor pole piece also having a predetermined length of pole face, the length of a rotor pole piece face being equal to the distance between the stator pole pieces, some of the pole pieces being provided with notches of a length equal to the face length of other pole pieces, the whole cooperating to effect point concentration in the magnetic circuits at each step or position of the rotor.

5. An electrical indicator motor including a stator comprising a plurality of electromagnets symmetrically spaced about a central axis, each magnet being provided with a pole piece having a predetermined length of pole face, a rotor cooperating with said stator, the rotor having its axis coincident with the said central axis, the rotor comprising a plurality of pole pieces, each rotor pole piece also having a predetermined length of pole face, the length of a rotor pole piece face being equal to the distance between the stator pole pieces, the rotor pole pieces being each provided with a notch of a length equal to the said predetermined length of a stator pole piece face, the whole cooperating to effect point concentration in the magnetic circuits at all cooperative regions between the stator and rotor pole pieces at each step or position of the rotor.

6. An electrical indicator motor including a stator comprising a single series of electromagnets symmetrically spaced about a central axis, each magnet being provided with a pole piece having a predetermined length of pole face, the pole faces being circumferentially arranged with the centers of the pole faces lying in a medial plane of the motor, a rotor cooperating with said stator, the rotor having its axis coincident with the central axis, the rotor including opposed electromagnets and comprising a plurality of pole pieces arranged between the said opposed electromagnets, each rotor pole piece also having a predetermined length of pole face, the rotor pole piece faces being also arranged circumferentially and the centers of such faces lying in the said medial plane.

7. An electrical indicator motor including a stator comprising a single series of electromagnets symmetrically spaced about a central axis, each magnet being provided with a pole piece having a predetermined length of pole face, the pole faces being circumferentially arranged with the centers of the pole faces lying in a medial plane of the motor, a rotor cooperating with said stator, the rotor having its axis coincident with the central axis, the rotor including opposed electromagnets and comprising a plurality of pole pieces arranged between said opposed electromagnets, each rotor pole piece also having a predetermined length of pole face, with the rotor pole piece faces also arranged circumferentially with their centers lying in the said medial plane, the length of a rotor pole piece being equal to the distance between stator pole pieces, the pole pieces being notched to provide mutual magnetic point concentration between the rotor pole pieces and the stator pole pieces at all cooperating regions therebetween.

8. An electrical indicator motor including a stator comprising a single series of electromagnets symmetrically spaced about a central axis, each magnet comprising an E-shaped core member and a magnet coil thereon so that each core member provides a partial magnetic circuit individual to its magnet coil, the central branch arm of the E shaped core member forming the pole piece of the electromagnet, the pole pieces of all the magnets being arranged circumferentially with the centers thereof lying in a medial plane of the motor, a rotor cooperating with said stator, the rotor having its axis co-incident with the central axis of the stator, the said rotor including axially spaced electromagnets and a plurality of pole pieces arranged between said spaced electromagnets, the rotor pole pieces being also arranged circumferentally with the centers thereof lying in said medial plane.

9. An electrical indicator motor comprising end supporting plates, a stator carried thereby and including a single series of electromagnets symmetrically spaced about a central axis, each magnet comprising an E-shaped core member attached to said end plates and a magnet coil thereon so that each core member provides a partial magnetic circuit individual to its magnet coil, the central branch arm of the E-shaped core member forming the pole piece of the electromagnet, the pole pieces of all the magnets being arranged circumferentially with the centers thereof lying in a medial plane of the motor, a rotor cooperating with said stator, the rotor having its axis co-incident with the central axis of the stator, the said rotor including axially spaced electromagnets carried by said end plates and a plurality of pole pieces arranged between said spaced electromagnets, the rotor pole pieces being also arranged circumferentially with the centers thereof lying in said medial plane.

10. An electrical indicator motor comprising end supporting plates, a stator carried thereby and including a single series of electromagnets symmetrically spaced about a central axis, each magnet comprising a core member attached at its opposite ends to said supporting plates and provided with a central branch arm and a magnet coil thereon arranged so that each core member provides a partial magnetic circuit individual to its magnet coil, the central branch arm of the core member forming the pole piece of the electromagnet, the pole pieces of all the magnets being arranged circumferentially with the centers thereof lying in a medial plane of the motor, a rotor cooperating with said stator, the rotor having its axis co-incident with the central axis of the stator, the said rotor including axially spaced electromagnets carried by said end plates and a plurality of pole pieces arranged between said spaced electromagnets, the rotor pole pieces being also arranged circumferentially with the centers thereof lying in said medial plane.

Signed at New York, in the county of New York and State of New York, this 18th day of April A. D. 1921.

FRANK W. WOOD.